(12) United States Patent
Miklós et al.

(10) Patent No.: US 11,343,343 B2
(45) Date of Patent: May 24, 2022

(54) METHOD OF, AND A MESSAGE BROKER FUNCTION FOR, DETECTING RACE CONDITIONS IN A SERVICE BASED COMMUNICATION ARCHITECTURE NETWORK

(71) Applicant: Telefonaktiebolaget LM Ericsson (publ), Stockholm (SE)

(72) Inventors: György Miklós, Pilisborosjenö (HU); Attila Mihály, Dunakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 152 days.

(21) Appl. No.: 16/638,489

(22) PCT Filed: Nov. 23, 2017

(86) PCT No.: PCT/EP2017/080164
§ 371 (c)(1),
(2) Date: Feb. 12, 2020

(87) PCT Pub. No.: WO2019/034267
PCT Pub. Date: Feb. 21, 2019

(65) Prior Publication Data
US 2020/0374358 A1    Nov. 26, 2020

Related U.S. Application Data

(60) Provisional application No. 62/545,779, filed on Aug. 15, 2017.

(51) Int. Cl.
| H04L 67/562 | (2022.01) |
| H04W 88/18 | (2009.01) |
| G06F 9/52 | (2006.01) |

(52) U.S. Cl.
CPC ......... *H04L 67/2809* (2013.01); *G06F 9/524* (2013.01); *H04W 88/182* (2013.01)

(58) Field of Classification Search
CPC ... H04L 67/2809; H04W 88/182; G06F 9/524
See application file for complete search history.

(56) References Cited

U.S. PATENT DOCUMENTS

| 2006/0218268 | A1* | 9/2006 | Beck | H04M 7/006 |
| | | | | 709/224 |
| 2015/0088999 | A1* | 3/2015 | Carr | H04L 67/02 |
| | | | | 709/206 |
| 2017/0214762 | A1* | 7/2017 | Swain | H04L 51/26 |

\* cited by examiner

*Primary Examiner* — Brian P Cox
(74) *Attorney, Agent, or Firm* — Murphy, Bilak & Homiller, PLLC

(57) ABSTRACT

A method of detecting race conditions in a service based communication architecture network (600) comprising a Message Broker, MB, function (210) mediating messages, relating to service procedures, between one or more services available to a User Equipment, UE, (11) communicating within the service based communication architecture network (600). The method comprising receiving, by the MB (210), from the services, a message relating to at least one of start and end of a service procedure. Determining, by the MB (210), based on the received message, that the service procedure causes a race condition, and intervening, upon detection of a race condition, in executing the service procedures. There is also provided a Message Broker, MB, function (210) arranged for detecting and handling race conditions, a communication network (600) comprising an integrated message broker and race condition handler (210) and a computer program product.

15 Claims, 6 Drawing Sheets

METHOD OF, AND A MESSAGE BROKER FUNCTION FOR, DETECTING RACE CONDITIONS IN A SERVICE BASED COMMUNICATION ARCHITECTURE NETWORK

TECHNICAL FIELD

The present disclosure generally relates to detecting race conditions in a service based communication architecture network. More particularly, the present disclosure relates to a method of detecting and handling race conditions by a Message Broker, MB, node in a telecommunication network, specifically a service based communication architecture network proposed for 5G communication networks.

BACKGROUND

Wireless systems and mobile networks of the $5^{th}$ generation, abbreviated 5G, are the telecommunications standards succeeding the current $4^{th}$ Generation, 4G/International Mobile Telecommunications-Advanced, IMT-Advanced, standards.

One of the goals of 5G is that the data traffic handling capacity thereof, compared to traditional 4G networks, is improved such that a higher density of User Equipment, UE, in a particular area can be obtained. Further, 5G research and development aim at lower latency than 4G equipment and lower battery consumption, for better implementation of, for example, Internet of Things, IoT, applications.

Compared to 4G networks, for example, traditional peer-to-peer interfaces and protocols are modified in 5G by a so-called Service Based Architecture, SBA, wherein Network Functions, NFs, provide support to one or multiple service consumers by means of an HTTP-based communication protocol. In other words, the different NFs may implement one or more services, which are self-contained functionalities that can be changed and modified in an isolated manner.

System procedures, such as, but not limited to, an attach procedure, a service request procedure, and a handover procedure, involve services within different NFs, and comprise a sequence of messages between these services, invoking service operations.

Two main types of messages have been defined: Synchronous (Request-response) messages and Asynchronous (Publish-Subscribe) messages. For both types of messaging, a Message Broker, MB, that also may be called a Message Proxy or Message Handler or Message Mediating, function may be employed, wherein the MB mediates the messaging between the different services and thus breaks out or isolates common messaging functions from the different services A problem that occurs in networking complex chains of messaging and processing involving different types of services is known as race condition. A race condition is a processing state wherein, for example, events do not happen in the order the programmer intended. This means that when different service procedures or processes run for the same User Equipment, UE, in parallel, it gets more difficult to provide consistent service operation across the whole system. An example of such a race condition in a communication network is when some session management (session establishment, session modification) actions are ongoing that require changes along the user plane path, while a handover occurs for the same UE, which also impacts the same user plane path. Some careful control is therefore needed to ensure UE context consistency, where several UE contexts can be stored with the respective NFs, in such situations.

Race Condition Handling, RCH, may be implemented separately in each NF, i.e. each NF detects and handles race conditions. This may require a pre-configured matrix, with an ongoing service procedure on one axis and the incoming message from another service procedure on the other axis. Therefore, each cell within the matrix corresponds to a particular message received during the execution of a particular service procedure. The cells of the matrix contain the actions for the processing scenarios. Multiple options for handling a race condition are conceivable.

The approach presented above may cause difficulties with increasing number of autonomous NFs and interoperability in a multivendor environment. It may be noted that, in such an approach, service procedure serialization in a distributed way with multiple NFs is not possible, due to the risk of the so called circular deadlock problem. This may be solved using a standalone RCH.

While a standalone RCH is a straightforward means for solving race conditions, it implies additional signaling over the control plane in the network, between the standalone RCH and the several NFs, which in turn involves additional processing delay, service processing and standardization effort. Besides, race conditions are rare events, and therefore a solution for RCH should present minimal overhead but it should also solve race conditions in a reliable way.

SUMMARY

The above mentioned and other problems are solved, in a first aspect of the present disclosure by a method of detecting race conditions in a service based communication architecture network comprising a message broker, MB, that also may be called a Message Proxy or Message Handler or Message Mediating, function mediating messages, relating to service procedures, between one or more services available to a User Equipment, UE, communicating within the service based communication architecture network.

The method comprises the steps of receiving, by the MB, from the services, a message relating to at least one of start and end of a service procedure, determining, by the MB, based on the message, that the service procedure causes a race condition, and intervening, upon detection of the race condition, in executing such service procedures.

According to the method disclosed, Race Condition Handling, RCH, functionality is embedded in the MB function. As the MB function receives messages from services or NFs, additional network signalling between the RCH and the services or NFs is effectively avoided and, thereby, additional processing efforts for coping with signalling delays. The messages sent by the different services towards the MB contain at least indicators of the start and end of a service procedure by the MB. With the present solution, the MB is able to detect the occurrence of race conditions depending on the start and end messages of one service procedure and comparing it to the start and messages of the other service procedures. Upon establishment, by the MB, that a race condition has occurred, the MB may intervene in the execution of a service procedure or process so as to avoid the race condition.

Such a step of intervention, by the MB, may be one or more of delaying execution, executing one service procedure at a time or pre-empting execution of by applying a priority queuing in the MB. This means that the execution of a service procedure may be continued once the race condition has been removed.

The present solution provides a convenient approach for applying priority handling or priority queuing. Priorities may be assigned internally by the MB in a service procedure priority handling scheme or may be assigned by the service requesting the service procedure. Priorities may include any of a "low", "high" or a "don't care" priority for each service procedure, for example. A priority may be indicated in a header portion of the message sent to the MB by the service, for example.

In a further embodiment of the disclosure, the step of intervening comprises aborting and restarting of service procedures causing the race condition. This may be advantageous from a point of view of maintaining overall service consistency.

Besides intervening in the execution of service procedures, in another embodiment of the present disclosure, race condition handling may comprise at least one of ignoring the message by the MB, delaying transfer of the message, and priority handling of the message such as proceeding with a new message immediately. The latter may lead to delay or cancelling one or more ongoing service procedures.

The MB, upon detecting that a race condition is likely to occur, may select one or more of the above measures based on the type of service procedures involved in the possible race condition. Furthermore, it may be noted that the solution according to the present disclosure is also capable of not merely handling race conditions upon the occurrence of a race condition, but also to take pre-emptive actions that will prevent the occurrence of race conditions in the network.

The MB may maintain a register for identifying each UE in the network. However, in an embodiment according to the present disclosure, the message received by the MB may comprise at least one of an identification of the UE requesting the services and an identification of the service procedure. Furthermore, the message may also contain an indication regarding the type of service procedure to be executed for the UE. Such service procedures may comprise, for example, attach request, service request, handover request or any other suitable service procedures to be performed by a service for the UE in the service based communication architecture network.

In practice, service based communication architecture networks may comprise centralized or decentralized MB functions. According to an embodiment of the present disclosure, the MB may be arranged for mediating a selection of service procedures.

An embodiment of the present disclosure, further comprises the additional steps of:
 registering, by the MB, the message in a procedure database;
 checking the procedure database for messages relating to ongoing service procedures,
 checking the procedure database for messages relating to scheduled service procedures
 checking the procedure database for priority messages;
 de-registering messages from the procedure database after completion of an associated service procedure.

By registering messages in a procedure database, an ongoing service procedure may lock other potential service procedures for this UE in the database until the service procedure is completed. While there are on-going service procedures for the UE, a new service procedure is added to the list of pending service procedures. Based on a pre-configured operator policy, a priority ordering of the queued service procedures in the database is possible. Lock for the next service procedure is acquired when all the other service procedures with higher priority on the list have been accomplished.

Once the service procedure has been executed, the MB may further receive an additional end of service procedure message from the service. To avoid database overload, upon the end of the service procedure execution, the MB de-registers the message from the procedure DB.

Messages relating to intervened service procedures may be stored in a procedure pending database. It may be advantageous in the processing of race condition, to maintain a list of service procedures with whose execution, the MB has intervened. Once a race condition has been solved, the service procedures stored within the procedure pending database may then be carried out one at a time in a prioritized manner, for example, based on a First In First Out queueing scheme.

According to an embodiment of the present disclosure, messages may be saved in a message database. This may be advantageous from a viewpoint of error handling in the future. This may also provide the system or a user of the system with a list of messages received from the various services and the corresponding actions taken by the MB. Furthermore, for the developer of a system, this may be helpful in acquiring information regarding race conditions and to aid the developer in programming to avoid future race conditions.

In a second aspect of the present disclosure, there is provided a Message Broker, MB, function arranged for detecting race conditions in a service based communication architecture network wherein the MB mediates messages, relating to service procedures, between one or more services available to a User Equipment, UE, communicating within the service based communication architecture network.

The MB function comprises:
 receive equipment arranged for receiving, from the services, a message relating to at least one of start and end of a service procedure;
 determine equipment arranged for determining, based on this message, that this service procedure causes a race condition, and;
 intervene equipment arranged for intervening, upon detection of the race condition, in executing the service procedures.

The MB function, may be a node or a server in the service based communication architecture network adapted for mediating messaging between various services the network. A message broker, generally, is a program module that translates a message from the formal messaging protocol of the sender to the formal messaging protocol of the receiver. Message brokers are elements in telecommunication or computer networks where software applications communicate by exchanging formally-defined messages.

In an embodiment, the MB function comprises:
 a message database, arranged for saving the message;
 a procedure database, arranged for registering the message, and
 a pending message database, arranged for storing messages relating to intervened service procedures.

As will be understood by those skilled in the art, the several databases may be embodied in a single database or in several remote databases.

According to an embodiment of the present disclosure, the MB further comprises:
 register equipment arranged for registering the received messages in the procedure database;

checking equipment arranged for, at least one of:
  checking the procedure database for messages relating to an ongoing service procedure;
  checking the procedure database for messages relating to scheduled service procedures, and
  checking the procedure database for priority messages;
execute equipment arranged for executing a service procedure requested by a service procedure initiation message if no previous messages are found or if no messages having a higher priority are found;
de-register equipment arranged for de-registering messages from the procedure database after completion of an associated process.

The various equipment could either be one of dedicated hardware and/or software modules.

In a third aspect of the present disclosure, there is presented a telecommunication network comprising a plurality of services and Message Broker, MB, functions in accordance with the first and second aspects of the present disclosure.

In a fourth aspect of the present disclosure, there is provided a computer readable storage medium, comprising instructions which, when loaded on to one or more nodes in a communication network, is arranged for performing the method according to the first aspect of the present disclosure.

The above and other aspects of the disclosure will be apparent from and elucidated with reference to the examples described hereinafter.

DETAILED DESCRIPTION

Figure 1:
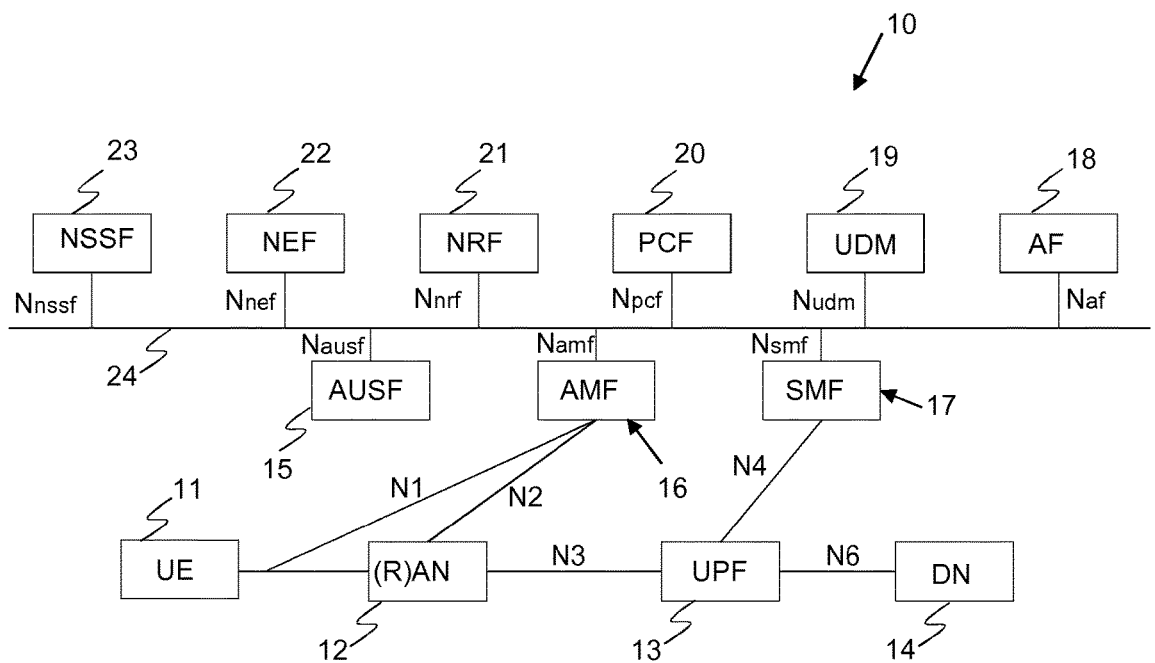
FIG. 1, schematically, illustrates a prior art service based communication architecture network.

In FIG. 1, reference number 10 indicates a reference architecture for a fifth generation, 5G, system. The 5G system architecture is built around a Service Based Architecture, SBA, paradigm. That is, the different functional components are defied as services, which are self-contained functionalities that can be changed and modified in an isolated manner, without affecting others. The 5G System architecture may comprise the following network functions, NFs:
  User Equipment, UE, 11
  (Radio) Access Network ((R)AN), 12
  User plane Function, UPF, 13
  Data network, DN, e.g. operator services, Internet access or 3rd party services, 14
  Authentication Server Function, AUSF, 15
  Core Access and Mobility Management Function, AMF, 16
  Session Management Function, SMF, 17
  Application Function, AF, 18
  Unified Data Management, UDM, 19
  Policy Control function, PCF, 20
  NF Repository Function, NRF, 21
  Network Exposure Function, NEF, 22
  Network Slice Selection Function, NSSF, 23
  Unified Data Repository, UDR, not shown,
  Structured Data Storage network function, SDSF, not shown,
  Unstructured Data Storage network function, UDSF, not shown.

The functional description of these network functions is specified, among others, in clause 6 of the 3GPP technical standard 23.501, "System Architecture for the 5G system", the contents of which are included herein, by reference. In such a service based communication architecture network, services may invoke procedures such as, but not limited to, an attach procedure, a service request procedure, handover procedure etc., that involve different NFs, and communicate with other services using messages.

Specifically, in FIG. 1, reference number 10 indicates the system architecture for a 5G telecommunication network in a non-roaming case. That is, the UE 11 is in the telecommunication network where it is originally registered. In other words, the UE 11 is in its home telecommunication network.

In the system architecture shown in FIG. 1, a proprietary Message Broker, MB, that also may be called a Message Proxy or Message Handler or Message Mediating, function may be introduced, which is arranged for mediating messages between the various services in the network. The MB may be distributed over the system, wherein each service has a dedicated MB functionality in order to interact with other services, or the MB may be located centrally operating on all services, for example.

Figures 2, 3:
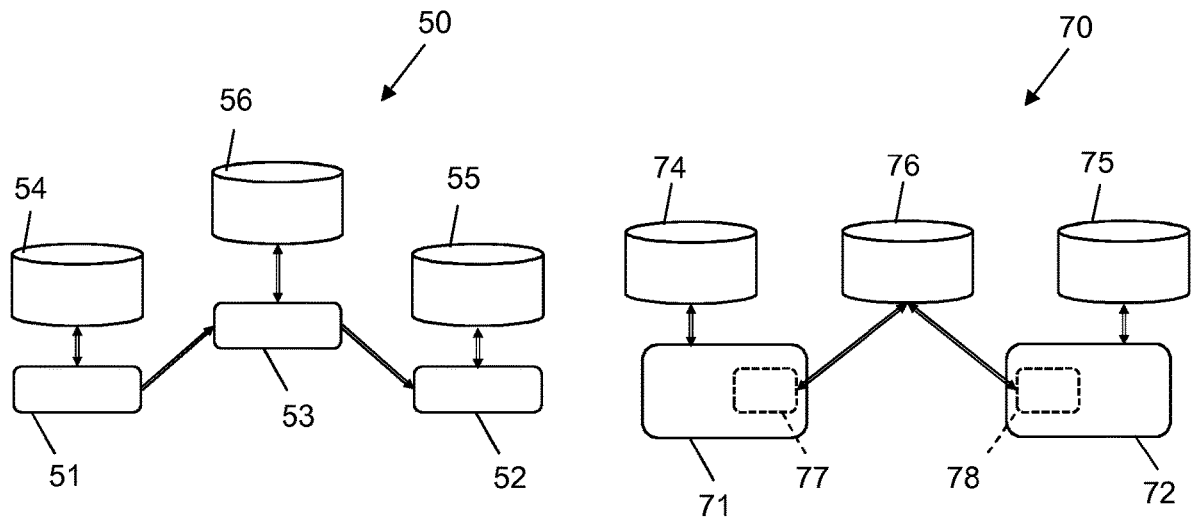
FIG. 2, schematically, shows the messaging between a service producer and a service consumer using a stand-alone message broker with a centralized message database, DB.
FIG. 3, schematically, shows the messaging between a service producer and a service consumer using an integrated message broker with a centralized message database, DB.

FIG. 2 shows schematically the messaging between a service producer 51 and a service consumer 52 using a stand-alone message broker, MB, 53 with a centralized message database, DB 56. A service producer 51 is any NF that is providing a certain service to another NF, the service consumer 52. Typically, the service consumer 52 requests a service from a service producer 51, and the service producer 51 replies. Alternately, the request-reply messages may also be replaced by a subscribe-notify messages.

A stand-alone MB 53, i.e., a separate entity that mediates the messages between service A, 51 (e.g. the service producer) and service(s) B, 52 (e.g. the service consumers). For scalability and redundancy reasons, i.e. for facilitating multiple instances of such a stand-alone MB, the messages are stored in a central DB, 56 (that may also be distributed for scalability reasons). The arrows in FIG. 2 show the communication between the different entities. Furthermore, the figure assumes a stateless architecture for the services, i.e.

the services store their context externally in a proprietary DB, but alternative service solutions with self-contained DB are also possible. Furthermore, the services 51, 52 interact with a User Equipment, UE, context database, 54, 55 respectively.

FIG. 3 shows schematically the messaging between a service producer 71 and a service consumer 72 using an integrated message broker 77, 78 respectively with a centralized message database, DB, 76. Integrated MB 77, 78 is a part of the service as a software module. Point-to-point communication between the different MBs 77, 78 is possible, however, to guarantee reliability of messaging, the integrated MBs 77, 78 can also be built around a central Message DB 76. The advantage is that the central DB 76 may alert (one of) the service producer's MB 77 of a failure e.g. after a timeout. Thus, the central DB 76 based solution protects both against failures of service producers and consumers. The assumption for the present disclosure is that the MB uses such a centralized Message DB 76. As noted earlier, the various services 71, 72 interact with respective UE context databases 74, 75.

Figure 4:
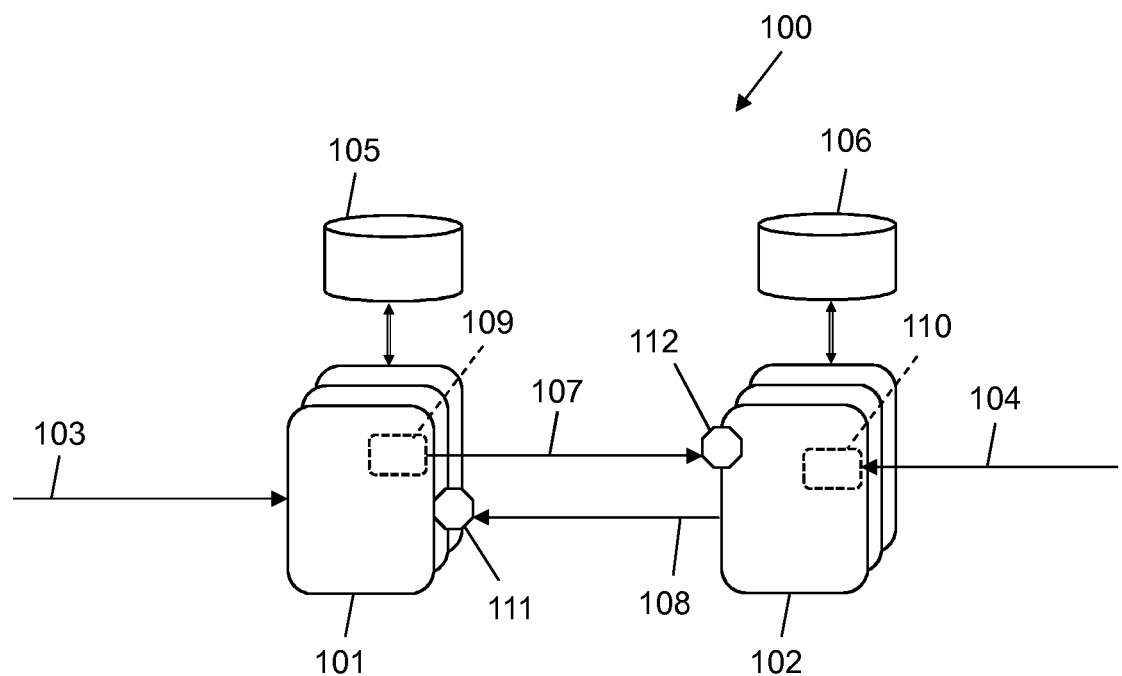
FIG. 4, schematically, illustrates an example of a circular deadlock between two services.

FIG. 4 schematically illustrates an example of a circular deadlock between two services 101, 102. The scope of the present disclosure is the Race Condition Handling, RCH, problem. With an increasing number of autonomous NFs and interoperability tests in multivendor environment, several issues may arise. Procedure serialization by e.g., blocking the messages of a newly detected service procedure until an on-going service procedure terminates, is not possible in a distributed way with multiple NFs due to the so-called circular deadlock problem. This problem is exemplified in FIG. 4, where two services 101, 102 are assumed, each getting simultaneously a trigger 103, 104 respectively for a new service procedure. Each service 101, 102 will try to enforce a serialization of the service procedures individually, thus blocking all other message processing until the service procedure it started has completed. If the service procedures require messaging between the two services, this will result in both service procedures pending. Since it is assumed that the triggers 103, 104 were received simultaneously, the independent Race Condition Handlers, 109, 110 send a message 107, 108 respectively to stop the execution of the other service procedure.

As an example, the RCH 109 of service 101 sends a message 107 to stop 112 the execution of the second service procedure received by trigger 104. Simultaneously, RCH 110 also sends a similar signal 108 to stop the execution of the service procedure received by trigger 103. Therefore, both the processes are caught in a circular deadlock and hence are prevented for being executed. Therefore, it may be appreciated that procedure serialization is not a straightforward solution to the problem of race condition detection and handling in a distributed system comprising of several network functions.

Figure 5:
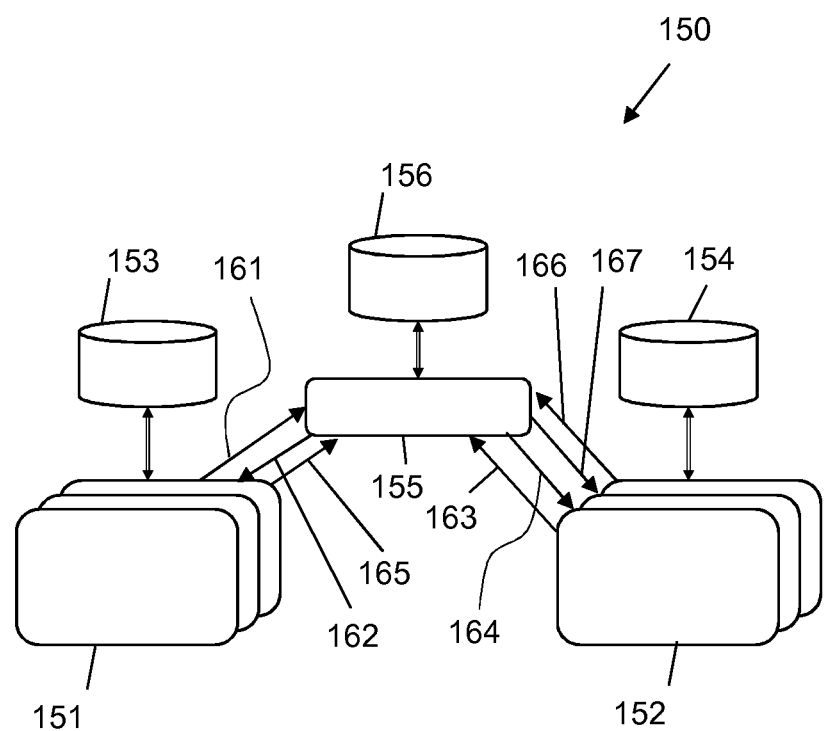
FIG. 5, schematically, shows an architecture for race condition handling using a standalone Race Condition Handler, RCH.

FIG. 5 schematically shows an architecture for race condition handling using a standalone Race Condition Handler, RCH, 155. This requires service procedure start and end info to be conveyed to RCH, 155 based on which the RCH 155, having a full view of the whole system, may accomplish a serialization of different service procedures by blocking the new service procedure until the ongoing one completes.

Consider the exemplary situation wherein one instance of Service A 151 wants to initiate a new service procedure say, procedure 1, such as an attach procedure, a request procedure, a handover procedure etc., for a certain UE and thus issues a "Lock request" 161 specifying the UE context and procedure 1 towards the RCH 155. The RCH 155 registers procedure 1 in the procedure DB 156 and replies 162 with a "Lock OK". While procedure 1 is ongoing an instance of another service (Service B) 152 wants to initiate another service procedure 2 (such as an attach procedure, a request procedure, a handover procedure etc.) for the same UE, thus it issues a "Lock request" 163 with the parameters (UE, procedure 2). The RCH 155 consults its DB 156 observing the ongoing procedure 1, thus it replies with a "Lock pending" 164 while registering procedure 2 in the procedure DB 156 in a pending status. Once procedure 1 terminates, Service A 151 issues a "Lock release" 165 for UE and procedure 1. The RCH 155 removes the locking procedure 1 from the DB 156 and instead it locks the UE context for the queuing procedure 2; afterwards, it issues a "Lock OK" 166 to service B 152 for procedure 2. Once procedure 2 terminates, service B 152 issues a "Lock release" for UE and procedure 2.

The above method illustrated in relation to the description of FIG. 5 achieves serialization of the procedures based on a First In First Out, FIFO, paradigm. Note that the stand-alone RCH 155 may apply other types of concurrency control for the parallel procedures for a given UE context, e.g. pre-emption of procedures, based on prioritized locking.

While the stand-alone RCH 155 as illustrated in FIG. 5 is a straightforward means for solving race conditions, it implies additional signaling which in turn means additional delay, service processing and standardization effort. Race conditions are rare events, and therefore a solution for RCH would be needed that in the general case of race condition-free operation represents minimal overhead but also solves race conditions in a reliable way.

Figure 6:
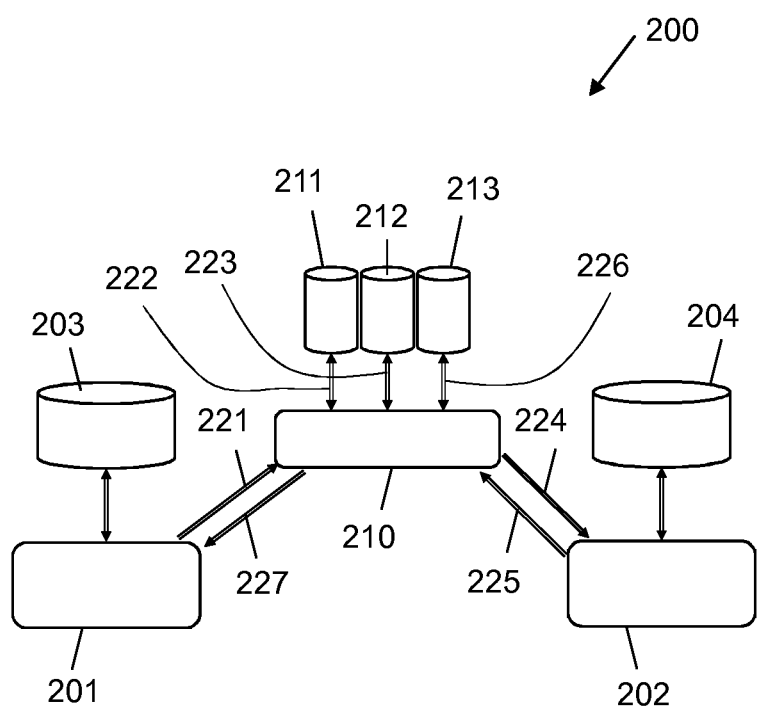
FIG. 6, schematically, shows an illustration of the basic concept according to the present disclosure.

FIG. 6 schematically shows an illustration of the basic concept according to the present disclosure. The operation of an MB enhanced with RCH functionality is shown in the example in FIG. 6, as a whole designated by reference numeral 210. Its operation consists of the following steps.

Service A 201 starts a new service procedure (say, procedure 1) for a certain UE by sending the initial message 221 towards the MB/RCH 210. The message may, according to an embodiment of the present disclosure, contain identification of the UE and procedure 1 for the MB/RCH 210. Besides the Message DB, 211 the MB/RCH 210 also maintains a procedure or process DB 212 where it registers procedure 1 for the given UE. If there are no more service procedures for the UE in the DB 212, then procedure 1 will lock other potential service procedures for this UE and the message is delivered 224 to Service B 202. The message could be also saved 222 to the message DB 211 for error handling reasons.

If there are other on-going service procedures for the UE, then procedure 1 is added to the list of ongoing service procedures. A priority ordering of the queued service procedures is possible based on a pre-configured operator policy. Lock for procedure 1 is acquired when all the other service procedures with higher priority on the list have been accomplished.

Procedure 1 continues at Service B 202. The end message of procedure 1 is sent 225 via the MB/RCH 210 (note that it may be sent by another service than Service B 202 and received by another service than Service A 201). The MB/RCH 210 removes 223 procedure 1 from the procedure DB 212 thus the lock on procedure 1 is released. The end message of procedure 1 is saved to the message DB 211 and delivered 227 to the consumer service 207 (Service A).

Upon receiving a service procedure of "high" priority, the MB/RCH 210 may stop execution of service procedures with "low" priority and transfer them to a procedure pending database 213 for execution at a later point in time. If, however, the currently ongoing service procedure is also of "high" priority, the newly incoming message may be transferred to the procedure pending database 213 until the execution of the current service procedure is completed.

Comparing this procedure with the stand-alone RCH-based system described in FIG. 5, it is apparent that there is significantly less number of signaling messages exchanged between the different entities. The reason is that any additional messages for RCH from and to the different services are spared, given that the messages should be sent to the MB anyhow. Moreover, since the same entity MB/RCH 210 performs the different DB operations, this opens up the possibility to optimize also the number of DB operations.

Pre-emption of an on-going service procedure becomes possible provided the service procedure may be split into sub-procedures where the different sub-procedures result in a consistent context. For example, a paging procedure may be split up into:

A first sub-procedure ending after SMF has initiated paging through an Access and Mobility Function, AMF, and the AMF has acknowledged it A second sub-procedure started with triggering paging in Radio Access Network, RAN, by the AMF.

It may be noted that paging retransmissions can also be regarded as individual sub-procedures, i.e. other service procedures are not held up during paging (but they should handle the case that paging is underway).

Figure 7:
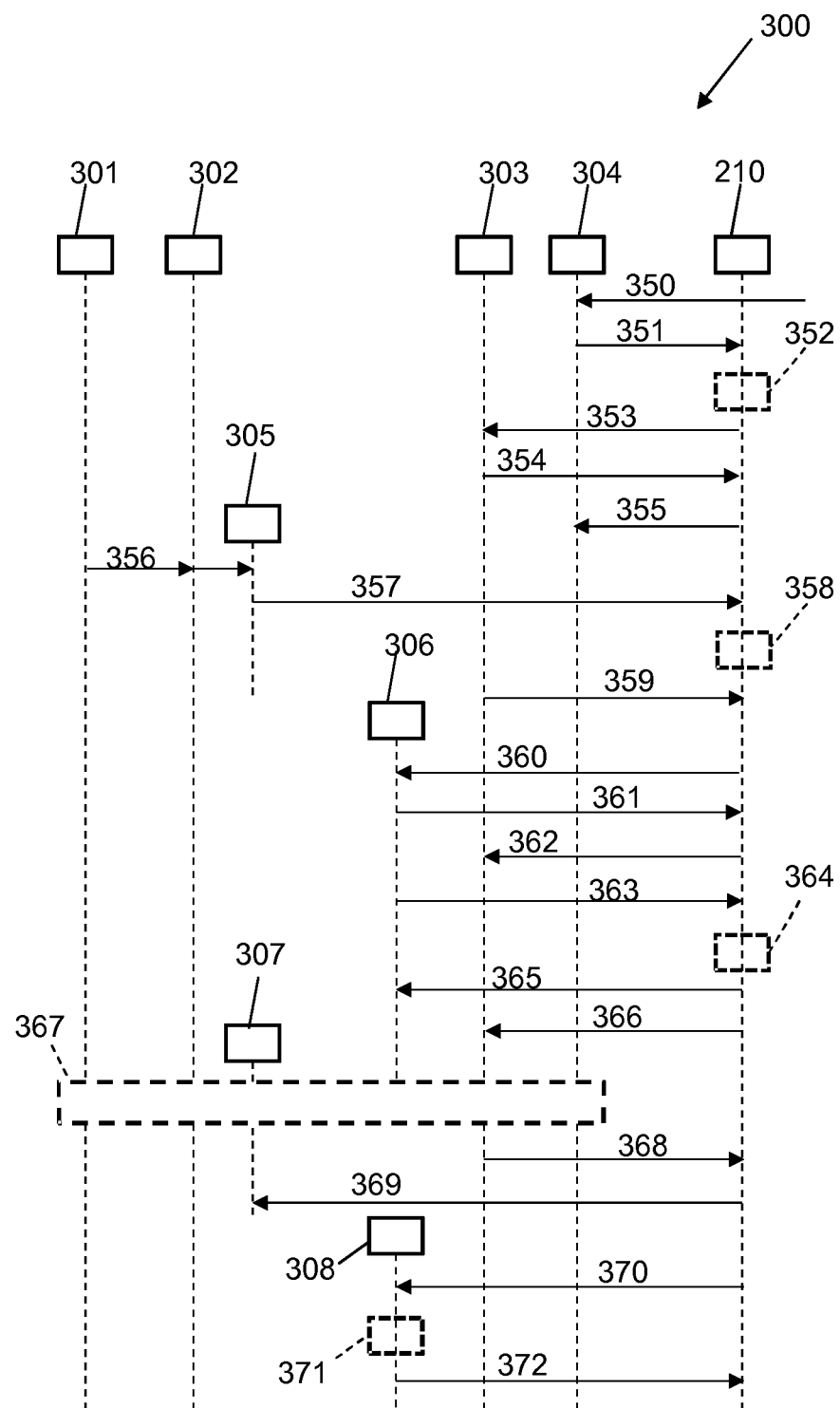
FIG. 7 shows a message sequence chart of a RCH for parallel paging and service request using combined MB and RCH.

FIG. 7 shows message sequence chart 300 of an RCH for a paging and service request using combined MB and RCH 210. The figure assumes that the messaging between all Communication Network, CN, nodes is handled by the MB/RCH 210, but the Radio Access Network, RAN, 302 communication is separately handled by the Access and Mobility Function, AMF 305, 306, 307, 308. In such cases when the communication of a (sub-)procedure is not mediated by the MB/RCH 210, it is proposed that before starting the service procedure the corresponding NF should send a procedure lock request, similar to the stand-alone RCH case. Thus, the AMF/2 306 will send a notification with a procedure lock request 363 to the MB/RCH 210 before it starts the paging procedure towards the RAN 302.

The main difference of the procedure according to the sequence chart 300 from an embodiment comprising a stand-alone RCH is that in the case of integrated MB/RCH 210, the MB/RCH 210 is notified implicitly of the start of the new sub-procedure through the messages received by the different CN NFs. That is, the Data Notification message 351 from the User Plane Function, UPF, 304 will lock the UE context for the first paging sub-procedure 352. Thus, the Service request message 356 indicating the start of the Request procedure and sent through the N11 reference point 357 from AMF/1 305 to the SMF 303 through the MB/RCH 210, will not be transferred to the destination, but instead the MB/RCH 210 will hold it until the termination of the parallel paging sub-procedure 358. When phase 1 of paging terminates, indicated by the Lock request for phase 2 of paging 363, the MB/RCH 210 releases the previously held Service request, which allows to run the Request procedure 364 before actual Paging messages are allowed to be sent 370 to RAN 302.

From FIG. 7, it is apparent that the race condition handling with combined MB/RCH 210 will effectively happen as in the case of the stand-alone RCH case, but sparing additional signalling and NF/service functionality. When there is no race condition, the execution time of the procedures can be the same as when no RCH is implemented.

It may be noted that the proposed RCH procedure is even more reliable than that provided by a stand-alone RCH because of the inherent MB capability of handling error conditions. For example, let us assume that AMF/2 306 becomes non-responsive after receiving the N11 paging message 360. In the stand-alone RCH case, this will cause a hanging service procedure execution because the procedure lock message for the next paging phase 362 will not arrive. However, in the case of combined MB/RCH 210, the MB/RCH 210 knows about the N11 message sent 360 to AMF/2 306 and thus the missing N11 message Ack 361 may be detected as a fault situation after a timeout in the MB, and thus the original N11 message 360 may be resent to another AMF, not shown in the figure, (assuming that the UE context is external to the AMF) to continue the paging procedure.

It may be further noted that the present disclosure also makes possible to abort and re-start a certain (sub-)procedure with minimal involvement of the different NFs/services. For this, the MB/RCH 210 should keep a copy of the first message of each procedure until the procedure terminates. Besides, the MB/RCH 210 should be capable of sending procedure abort commands to the different NFs, based on which the given NF should reset the context to the stage at the beginning of the procedure, i.e., when the first message is sent. Thus, if a service procedure is explicitly aborted, when the parallel procedure terminates, the aborted service procedure can be re-initiated by simply resending the first message of the service procedure by the MB/RCH 210. The advantage of abort and re-start compared to pre-emption is that the parallel procedure may be started immediately, thus it is not delayed until the ongoing (sub-)procedure terminates.

Figure 8:
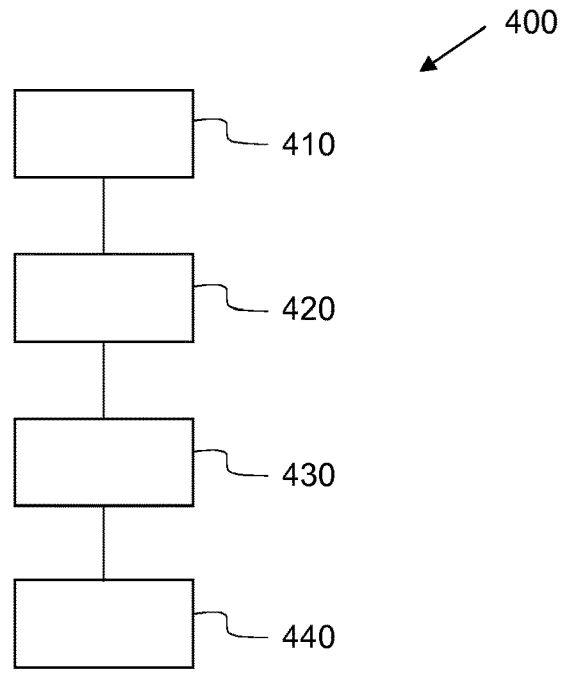
FIG. 8, schematically, illustrates a method of detecting and handling race conditions according to the present disclosure.

FIG. 8 schematically illustrates a method 400 of detecting and handling race conditions according to the present disclosure. In a first step of receiving, 410, the combined message broker, MB/RCH 210, receives a message relating to the execution of a service procedure from a service. This received message is sent by a service and usually contains information regarding the procedure to be executed by another service. Additionally, the message may also contain information relating to the UE for which the service procedure is to be performed and also an indication regarding the type of the service procedure to be performed. From the procedure type and message type, the MB/RCH may identify whether the message is starting message for a given procedure, which will trigger a procedure lock for the given context.

In step 420, the combined MB/RCH 210 determines that a race condition has occurred in the network. This may be, for example, when the MB/RCH 210 detects that there is already an ongoing service procedure concerning the same UE. In order to detect the occurrence of a race condition, the MB/RCH 210 may adopt any of several options available. According to an example, the MB/RCH 210 stores all incoming messages to a message database 211 and all ongoing service procedures to a procedure database, DB 212. Upon receiving a message pertaining to a new service procedure, the MB may check the contents of the procedure DB 212 and determine that a conflict and a race condition is likely to occur.

In step 430, of intervening, the MB/RCH 210 may decide to intervene in the execution of one or more service procedures that are giving rise to the race condition in the network. The step of intervening may involve, for example, delaying the execution of one or more service procedures, or executing one service procedure at a time, or pre-empting the execution of one or more procedures by priority queueing the involved procedures. It may be desirable to maintain an additional procedure pending DB 213 in such cases, wherein service procedures that are yet to be executed are stored. The MB/RCH 210 may then execute service procedures from the procedure pending DB 213 one at a time by selecting them using a suitable criteria, such as First-in-First-out or by applying a priority.

In alternate embodiments, the step of intervening may perform an operation on an incoming message. For example, the MB may ignore a second message relating to a second service procedure, or the MB may delay the delivery of a second incoming message relating a second service procedure for the same UE. Alternately, the MB may proceed immediately with the new message, thereby halting the execution of a first ongoing service procedure.

In an embodiment, the method may also comprise of additional steps 440, wherein an incoming message towards the MB is first registered in a message DB 211 and the related service procedure is registered in a procedure DB 212. The MB/RCH 210 may further, in step 440, check whether there are any other ongoing service procedures for the UE in either the procedure DB 212 or a procedure pending DB 213. The MB/RCH 210 may then proceed to advance the service procedure and upon completion of the service procedure continue to de-register the service procedure from the procedure DB 212. If, on the other hand it is determined that there are on-going procedures for the same UE and/or other incoming service procedures with a higher priority, the first received service procedure is entered into the procedure pending database 213 and is advanced after completion of other ongoing service procedures or procedures with a higher priority.

Figure 9:
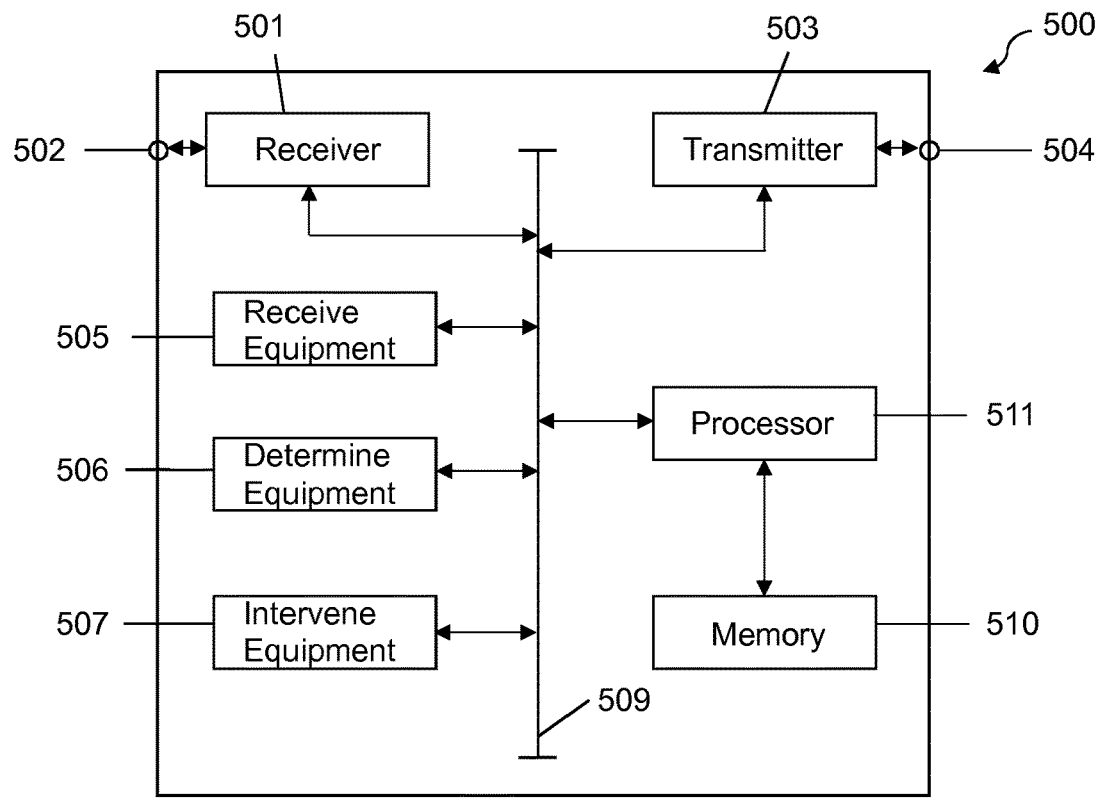
FIG. 9, schematically, shows an embodiment of a network element arranged for detecting and handling race conditions according to the present disclosure.

FIG. 9 schematically shows an embodiment of a network element 500 arranged for detecting and handling race conditions according to the present disclosure. The network element 500, comprises a receiver 501, 502, arranged for receiving communication signals within a telecommunication network. Preferably, the network element 500 is a Message Broker, MB, which is also arranged for detection and handling of race conditions RCH according to the present disclosure. The present disclosure primarily concerns a 5G telecommunication network, wherein functional components, referred to as services communicate with one another using messages. The receiver 501, 502 is therefore arranged to receive such messages. The receive equipment 505 is specifically arranged to receive messages relating to initiation and termination of a service procedure to be performed. The determine equipment 506, is arranged for determining the occurrence of a race condition based on the received message for a new service procedure.

The determine equipment may also interact with databases (not shown in the figure, within the network element 500 in order to determine the occurrence of a race condition. According to an example, the network element, 500 also comprises a message database, a procedure database and a procedure pending database, not shown in the figure. The determine equipment communicates with these databases to determine whether a race condition has occurred or is likely to occur.

The node further comprises an intervene equipment 507, which is arranged for intervening in the execution of one or more service procedures that give rise to a race condition. The intervene equipment may be arranged to act pre-emptively when it is determined that a race condition is likely to occur.

The network element 500 comprises a processor 511 and a memory, 510. All the equipments, 505-508, interact with one another and with the processor 511 via a communication bus 509. Transmit equipment 503 and 504 are also provided within the example in order to facilitate communication with external devices such as User Equipment, UE, or other network functions.

Figure 10:
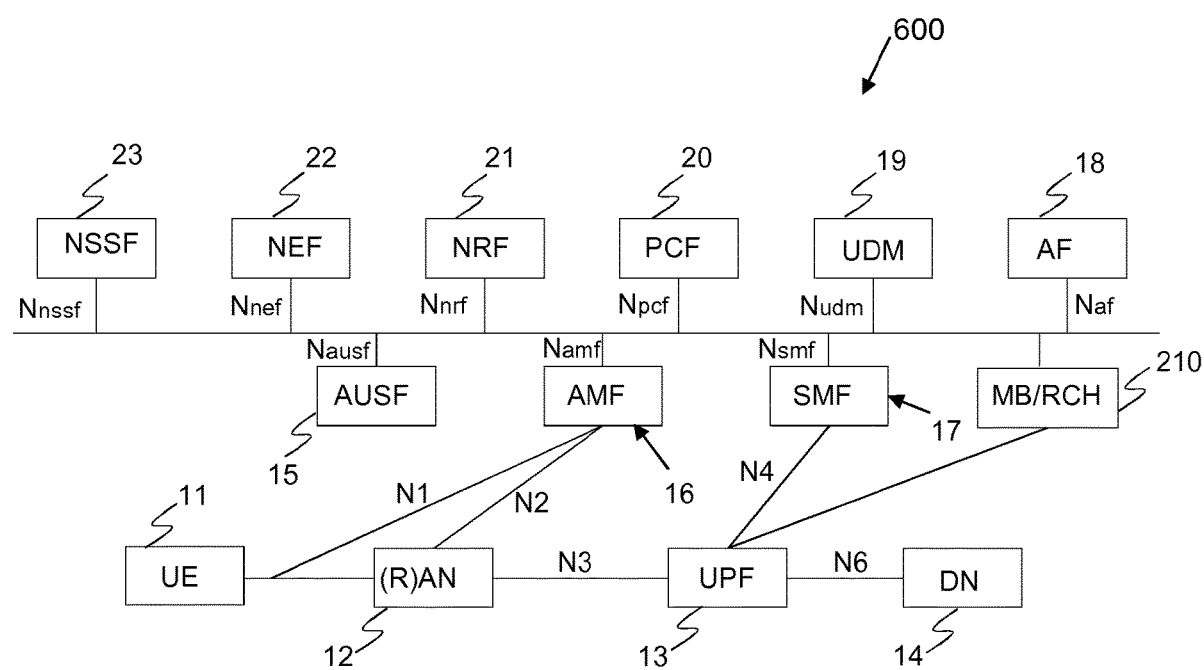
FIG. 10, schematically, illustrates a service based communication architecture network with a message broker function arranged for race condition handling according to the present disclosure.

FIG. 10, schematically, illustrates an example of a service based communication architecture network 600 in accordance with the present disclosure. The architecture of the network 600 is in general similar to the network 10 illustrated in FIG. 1. It is noted that the integrated Message Broker and Race condition Handler, MB/RCH, 210 not necessarily requires a connection to all the services or network functions, as illustrated in this embodiment. The respective services or network functions neither require to be directly interconnected via the 'bus' connection 24 as shown, since they may interconnect through the MB/RCH 210. The MB/RCH 210 is arranged for operating in accordance with an or any embodiment of the method according of the present disclosure.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of detecting race conditions in a service based communication architecture network comprising a message broker (MB) function mediating messages, relating to service procedures, between one or more services available to a User Equipment (UE) communicating within said service based communication architecture network, the method comprising:
receiving, by said MB, from said services, a message relating to at least one of start and end of a service procedure;
determining, by said MB, based on said at least one of start and end of said service procedure indicated by said message, that said service procedure causes a race condition; and
intervening, upon detection of said race condition, in executing said service procedures.

2. The method of claim 1, wherein said intervening comprises delaying execution of said service procedure during said race condition.

3. The method of claim 1, wherein said intervening comprises executing a single one of said service procedures causing said race condition.

4. The method of claim 1, wherein said intervening comprises pre-empting execution of said service procedures causing said race condition by applying priority queueing in said MB.

5. The method of claim 1, wherein said intervening comprises aborting and restarting of service procedures causing said race condition.

6. The method of claim 1, wherein said intervening in said service procedure comprises at least one of:
  ignoring said message by said MB;
  delaying transfer of said message, and
  priority handling of said message.

7. The method of claim 1, wherein said message received by said MB comprises at least one of an identification of said UE, and an identification of the service procedure.

8. The method of claim 1, wherein said MB is configured to mediate a selection of service procedures.

9. The method of claim 1, further comprising:
  registering, by said MB, said message in a procedure database;
  checking said procedure database for messages relating to ongoing service procedures;
  checking said procedure database for messages relating to scheduled service procedures;
  checking said procedure database for priority messages, and
  de-registering messages from said procedure database after completion of an associated service procedure.

10. The method of claim 9, wherein said registering further comprises:
  saving, by said MB, said message in a message database.

11. The method of claim 1 further comprising:
  storing, by said MB, in a procedure pending database, messages relating to intervened service procedures.

12. A Message Broker (MB) function arranged for detecting race conditions in a service based communication architecture network wherein said MB mediates messages, relating to service procedures, between one or more services available to a User Equipment (UE) communicating within said service based communication architecture network, the MB function comprising:
  receive equipment configured to receive, from said services, a message relating to at least one of start and end of a service procedure;
  determine equipment configured to determine, based on said at least one of start and end of said service procedure indicated by said message, that said service procedure causes a race condition, and
  intervene equipment configured to intervene, upon detection of said race condition, in executing said service procedures.

13. The MB function of claim 12, wherein said MB function further comprises:
  a message database, configured to save said messages;
  a procedure database, configured to register said message, and
  a pending message database, configured to store messages relating to intervened service procedures.

14. The MB function according to claim 13, further comprising:
  register equipment configured to register said received messages in said procedure database;
  checking equipment configured to perform at least one of the following:
    checking said procedure database for messages relating to an ongoing service procedure;
    checking said procedure database for messages relating to scheduled service procedures, and
    checking said procedure database for priority messages;
  execute equipment configured to execute a service procedure requested by a service procedure initiation message if no previous messages are found or if no messages having a higher priority are found, and
  de-register equipment configured to de-register messages from said procedure database after completion of an associated process.

15. A non-transitory computer-readable storage medium comprising instructions arranged so that, when loaded on to one or more nodes in a service based communication architecture network comprising a message broker (MB) function mediating messages, relating to service procedures, between one or more services available to a User Equipment (UE) communicating within said service based communication architecture network, the instructions cause the one or more nodes to:
  receive, by said MB, from said services, a message relating to at least one of start and end of a service procedure;
  determine, by said MB, based on said at least one of start and end of said service procedure indicated by said message, that said service procedure causes a race condition; and
  intervene, upon detection of said race condition, in executing said service procedures.

* * * * *